United States Patent [19]

Bryan

[11] Patent Number: 5,139,736
[45] Date of Patent: Aug. 18, 1992

[54] FUEL ASSEMBLY SUPPORT GRID

[75] Inventor: William J. Bryan, Granby, Conn.

[73] Assignee: Combustion Engineering, Inc., Windsor, Conn.

[21] Appl. No.: 679,784

[22] Filed: Apr. 3, 1991

[51] Int. Cl.⁵ .............................................. G21C 3/34
[52] U.S. Cl. .................... 376/442; 376/438; 376/462; 376/439
[58] Field of Search .............. 376/438, 462, 442, 439; 976/DIG. 74, DIG. 79, DIG. 80, DIG. 81

[56] References Cited

U.S. PATENT DOCUMENTS

| | | | |
|---|---|---|---|
| 3,664,924 | 5/1972 | Krawiec | 376/442 |
| 3,715,275 | 2/1973 | Krawiec | 376/442 |
| 4,028,180 | 6/1977 | Finch | 376/442 |
| 4,740,350 | 4/1988 | Taleyarkhan | 376/441 |
| 4,803,043 | 2/1989 | Demario et al. | 376/442 |
| 4,879,090 | 11/1989 | Perrotti et al. | 376/462 |

FOREIGN PATENT DOCUMENTS 0332941A  9/1989  European Pat. Off. ........... 376/442

*Primary Examiner*—Brooks H. Hunt
*Assistant Examiner*—Meena Chelliah
*Attorney, Agent, or Firm*—Chilton, Alix & Van Kirk

[57] ABSTRACT

A strip (16) for an eggcrate-type nuclear fuel assembly grid (10), in which the fuel rod support springs (30,36) are formed by beams (75,77) and a connecting arch (78). More particularly, the strip has a substantially flat body (56), upper and lower edges (84,86) defining the strip vertical height, and opposed side edges (80) defining the length of the body. The fuel rod support structure (30) projects transversely from the body and comprises a plurality of spring members spaced apart in the longitudinal direction along the body, each spring member having a pedestal portion (75,77) resiliently supported by the body and a contact portion (78) integrally formed on and projecting from the pedestal portion. The pedestal portion preferably includes a beam integrally constrained at both ends by the body. By integrally fixing the ends, the spring member can be considerably smaller and produce the same force for a given deflection as a conventional grid.

12 Claims, 6 Drawing Sheets

FUEL ASSEMBLY SUPPORT GRID

BACKGROUND OF THE INVENTION

The present invention relates to nuclear reactor fuel assemblies and more particularly to a zircaloy fuel assembly grid designed to improve fuel rod support, strength, and reactor performance.

It is well known that the nuclear fuel for heterogeneous nuclear reactors is in the form of fuel elements or rods which are grouped together in side-by-side assemblies or bundles. These fuel assemblies also include fixed rods containing burnable poisons and hollow tubes through which control element assemblies are arranged to pass. The liquid moderator-coolant, normally water, flows upwardly through the reactor core in channels or longitudinal passageways formed between the fuel rods and fuel assemblies. One of the operating limitations on current reactors is established by the onset of film boiling on the surfaces of the fuel element rods. The phenomenon is commonly referred to as departure from nucleate boiling (DNB) and is affected by the fuel element spacing, system pressure, heat flux, coolant enthalpy and coolant velocity. When DNB occurs, there is a rapid rise in the temperature of the fuel element due to the reduced heat transfer, which can ultimately result in failure of the element. Therefore, in order to maintain a factor of safety, nuclear reactors must be operated at a heat flux level somewhat lower than that at which DNB occurs. This margin is commonly referred to as the "thermal margin".

Nuclear reactors normally have some regions in the core which have a higher neutron flux and power density than other regions. This situation may be caused by a number of factors, one of which is the presence of control rod channels in the core. When the control rods are withdrawn, these channels are filled with moderator which increases the local moderating capacity and thereby increases the power generated in the fuel. In these regions of high power density known as "hot channels", there is a higher rate of enthalpy rise than in other channels. It is such hot channels that set the maximum operating conditions for the reactor and limit the amount of power that can be generated since it is in these channels that the critical thermal margin is first reached.

Attempts have been made in the past to solve these problems and increase DNB performance by providing the support grid structures, employed to contain the members of the fuel assembly, with integral flow deflector vanes. These vanes can improve performance by increasing coolant mixing and fuel rod heat transfer ability downstream of the vanes. These attempts to improve performance have met with varying success depending on the vane design and the design of other grid components which can impact the effectiveness of vanes. To maximize the benefit of the vanes, the size, shape, bend angle, and location of the vanes must be optimized. The vanes are especially beneficial adjacent to the hot channels. The remaining components of the grid which include the strips, rod support features and welds must be streamlined to reduce the turbulence generated in the vicinity of the vanes. Further constraints on designing the grids include minimizing grid pressure drop and maximizing grid load carrying strength.

Grids are generally of egg-crate configuration and are spaced longitudinally along the fuel assembly to provide support for the fuel rods, maintain fuel rod spacing, promote mixing of coolant, provide lateral support and positioning for fuel assembly guide tubes, and provide lateral support and positioning for the instrumentation tube. The grid assembly usually consists of individual strips that interlock to form a lattice. The resulting square cells provide support for the fuel rods in two perpendicular planes. In general, each plane has three support points: two support arches and one spring. The springs and arches are stamped and formed in the grid strip and thus are integral parts of the grid assembly. The springs exert a controlled force, preset so as to optimally maintain the spring force on the fuel rod over the operating life of the fuel assembly.

Fuel assemblies employing spacer grids with flow deflector vanes have usually been fabricated substantially or entirely of inconel or a zirconium alloy, i.e., zircaloy. The inconel grid employing a brazed intersection connection has the advantage of greater strength because of the higher strength of inconel and because the brazing process bonds the intersection of the strips along its entire length. Brazing also has the advantage of providing little or no obstruction to flow. Due to the increased strength, the strip thickness of an inconel grid can be reduced relative to the zircaloy grid to reduce pressure drop and turbulence in the vicinity of the vanes. However, the common use of annealed zircaloy as a grid material has been a result of its low neutron capture cross-section. A low neutron capture cross-section makes nuclear fission more efficient, thus making the nuclear reactor operate more economically. However, to achieve a strength equivalent to that of an inconel grid, the strip thickness for a zircaloy grid must be increased, thus creating more turbulence and higher pressure drop. Also, the joining of the interlocking zircaloy strips requires welding which melts some grid material to form a weld nugget. The increased strip thickness and weld nuggets for zircaloy grids increase turbulence and grid pressure drop and reduce the effectiveness of the vanes. Therefore, the DNB performance of a zircaloy grid containing flow vanes is degraded relative to an inconel grid vane design.

SUMMARY OF THE INVENTION

It is an object of the present invention to enhance the in-reactor performance of conventional zircaloy grids containing flow vanes by improving the fuel rod support, load carrying strength, pressure drop, and handling characteristics.

This is accomplished with the present invention, by a fuel rod support spring formed by beams and a connecting arch. This not only lowers the flow blockage of the fuel rod supports while maintaining their support function, but can produce a spring effect that is 16 times stiffer than a conventional cantilever beam spring for the same parameters.

More particularly, the invention is directed to a grid strip for a nuclear fuel assembly, the strip having a substantially flat body, upper and lower edges defining the strip vertical height, and opposed side edges defining the length of the body. The fuel rod support structure projects transversely from the body and comprises a plurality of spring members spaced apart in the longitudinal direction along the body, each spring member having a pedestal portion resiliently supported by the body and a contact portion integrally formed on and projecting from the pedestal portion. The pedestal portion preferably includes a beam integrally constrained at both ends by the body. By integrally fixing the ends, the spring member can be considerably smaller and produce the same force for a given deflection as a conventional grid.

For a typical fuel assembly grid, a spring member stiffness of between 250 lbs/in and 500 lbs/in is desirable. Operating reactor experience indicates that the initial spring pre-load on the fuel rod, due to the spring deflection during rod insertion in the cell, has relaxed to zero after a single cycle of reactor operation. This indicates that the stress levels are high in the conventional cantilever springs. By use of the beam spring member of the present invention, the stress levels will be reduced and rod preloads maintained over longer reactor operation times.

Because the grids are formed by interwoven zircaloy strips which form multiple cells, each cell having springs on two adjacent walls and a pair of projections or arches on each of the other two walls, the springs laterally impress controlled resistive forces on each fuel rod in the assembly. One disadvantage inherent in this basic design is that the inwardly projecting springs and arches occasionally mark or score the surface of fuel rods as the rods are pulled into the fuel assembly grids during initial loading of the grids. In carrying out this fuel rod loading operation, the grids are held immovably in position while a longitudinal steel rod attached to the end of a fuel rod pushes or pulls it axially through the aligned cells in the grids. As the rod engages the springs and arches in the grid cells, the edges of the fuel support structure in the cell engage the exposed surface of the moving fuel rod and, in some cases, score its surface sufficiently deep so as to cause the rod to fall outside established fuel rod surface specifications. Also, with conventional cantilever springs, the rods engage the springs at an angle determined by the angle on the edge of the spring. To eliminate this problem, arches and springs of the present invention have been designed with a crown, to decrease turbulence and pressure drop as well as the scorability of the rod. The beam spring member also eliminates the problem of engagement at an angle between the rod and the spring. In addition, the unique use of a pair of beams to give spring support through a connecting arch also lowers the shadow profile of the grid, and thus its pressure drop.

As mentioned above, zircaloy spacer grids do not possess the mechanical strength of an inconel grid of similar design. Forming fuel rod support structure by integral cutouts tends to weaken the strip still further. While the strength of reactor fuel assembly spacer grids could be increased by the use of metals having a greater stiffness than annealed zircaloy, most of such higher strength materials are characterized by higher neutron capture cross-section when compared to zircaloy. To continue using zircaloy grid strip material while maintaining the required strength, the unslotted section of the grid strip of the present invention has minimum cutouts. This was accomplished by the use of a pair of beams with a supporting arch connecting them at the center, thereby forming an "H" shaped member such that the cross piece laterally impresses a controlled resistive force on each fuel rod. The high spring rate provided by small spring structure permits the spring member to be located in the vertically slotted section of the grid strip. The design maintains a continuous path of cross load resistance (unslotted material) which is much larger than previously available and thus has a much higher strength as compared to conventional zircaloy grids of equal thickness and height. Tests have shown an increase in strength of 15-20% over grids with cutouts throughout.

Intermediate welds are also provided to improve the strength of the grid. The grid strip slots are provided with tapers to facilitate welding at intermediate vertical locations on the strip, thus improving grid strength. Tests have shown an increase in strength of approximately 15% for each intermediate weld over conventional zircaloy grids without intermediate welds. If required, the grid may be welded at three intermediate points, thus increasing its strength by 45% over prior art grids.

The outer strips of the grid have also been optimized with respect to strength, handling, turbulence generation, and pressure drop. To obtain additional strength, small ribbed and round dimple stiffeners were employed along the outer strip's entire length. These stiffeners not only increase the buckling resistance of the grid but improve the strip's resistance to interact, i.e., catch or hang up with adjacent fuel assemblies, which reduces the potential for handling damage. In addition, the optimized outer strip design more effectively spreads accident loadings throughout the grid interior strips thus increasing strength.

Thus, in accordance with the invention, the crush strength of a zircaloy reactor assembly spacer grid is increased. This increase is principally attributable to the improved interior strips, but the perimeter strips make a significant contribution. The perimeter strip is characterized by small stiffening ribs and round dimple stiffening features. The ribs extend around the perimeter strips at two elevations and are ridged inwardly. The dimples also extend inwardly into some or all of the fuel rod-receiving grid cells, thereby serving to rigidize the perimeter strip and functioning as either arches for fuel rod support or backup arches for the integral fuel rod positioning springs which extend inwardly from the perimeter strip. The junction of the internal strip to the perimeter strip, in accordance with the present invention, is characterized by a weld seam of substantially greater length than has previously been employed. The increased weld seam length also enhances the strength of the grid.

BRIEF DESCRIPTION OF THE DRAWINGS

These and other objects and advantages of the invention will be described more fully below with reference to the accompanying drawings of the preferred embodiment, in which.

DESCRIPTION OF THE DRAWINGS

Figure 1:
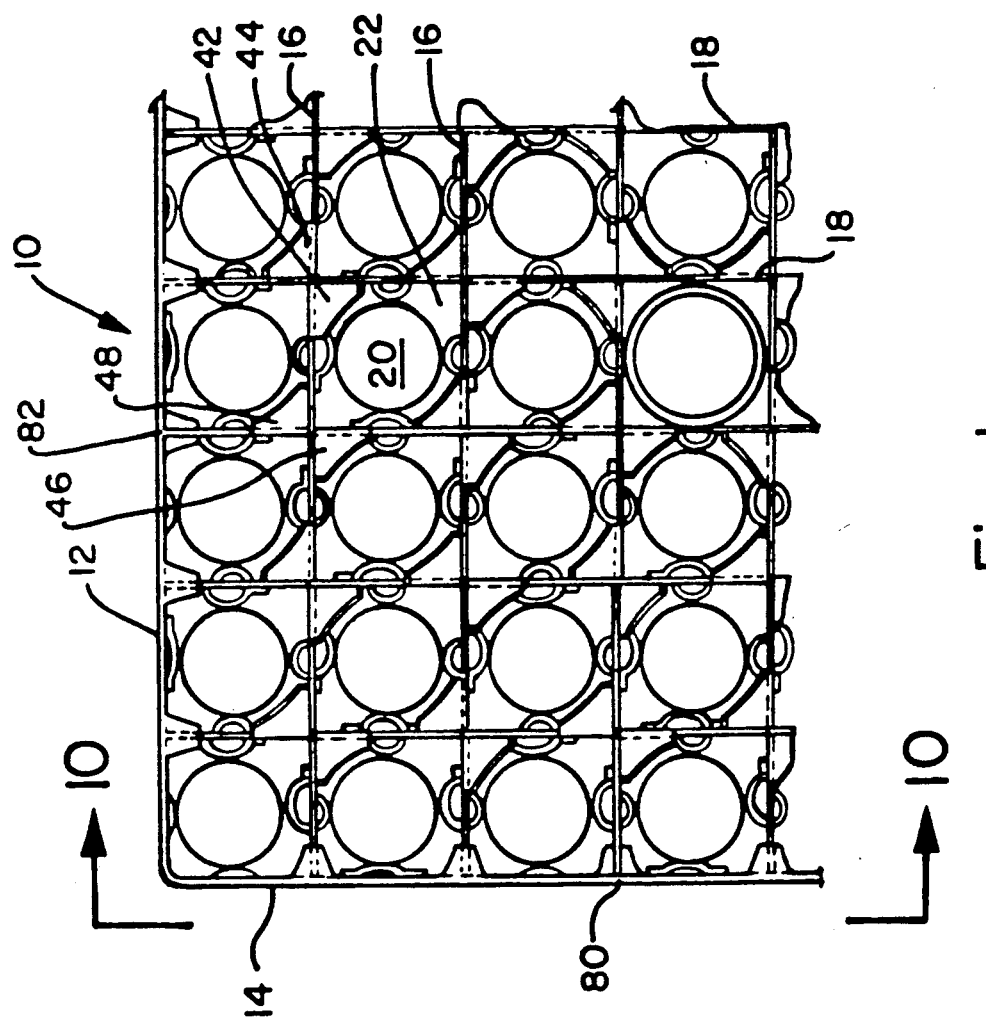
FIG. 1 is a plan view of a portion of an improved spacer grid which embodies the present invention.

FIG. 1 shows a nuclear fuel assembly grid 10 for use in a fuel assembly of the type shown in U.S. Pat. No. 4,879,090, the disclosure of which is hereby incorporated by reference. The assembly has opposed perimeter strips 12 oriented left to right in FIG. 1 (only one shown) and opposed perimeter strips 14 extending top to bottom (only one shown), all four of which define a rigid, generally square envelope. A plurality of interior grid strips 16 running from right to left, and a similar plurality of grid strips 18 running from top to bottom, are interconnected to each other in egg crate fashion, and are connected at their opposed ends to respective perimeter strips 14,12. For convenient reference, the perimeter strips 12 and internal strips 16, will be designated type A, whereas the perimeter strips 14 and similarly oriented grid strips 18, will also be designated B.

The grid 10 thus defines a regular array of cells 22, through which fuel rods 20 pass respectively in the direction toward and away from the viewer of FIG. 1. The interengaged grid strips 16,18 form four walls which define the cells 22 and which carry fuel rod support structure of a type to be described in greater detail below.

Figure 2:
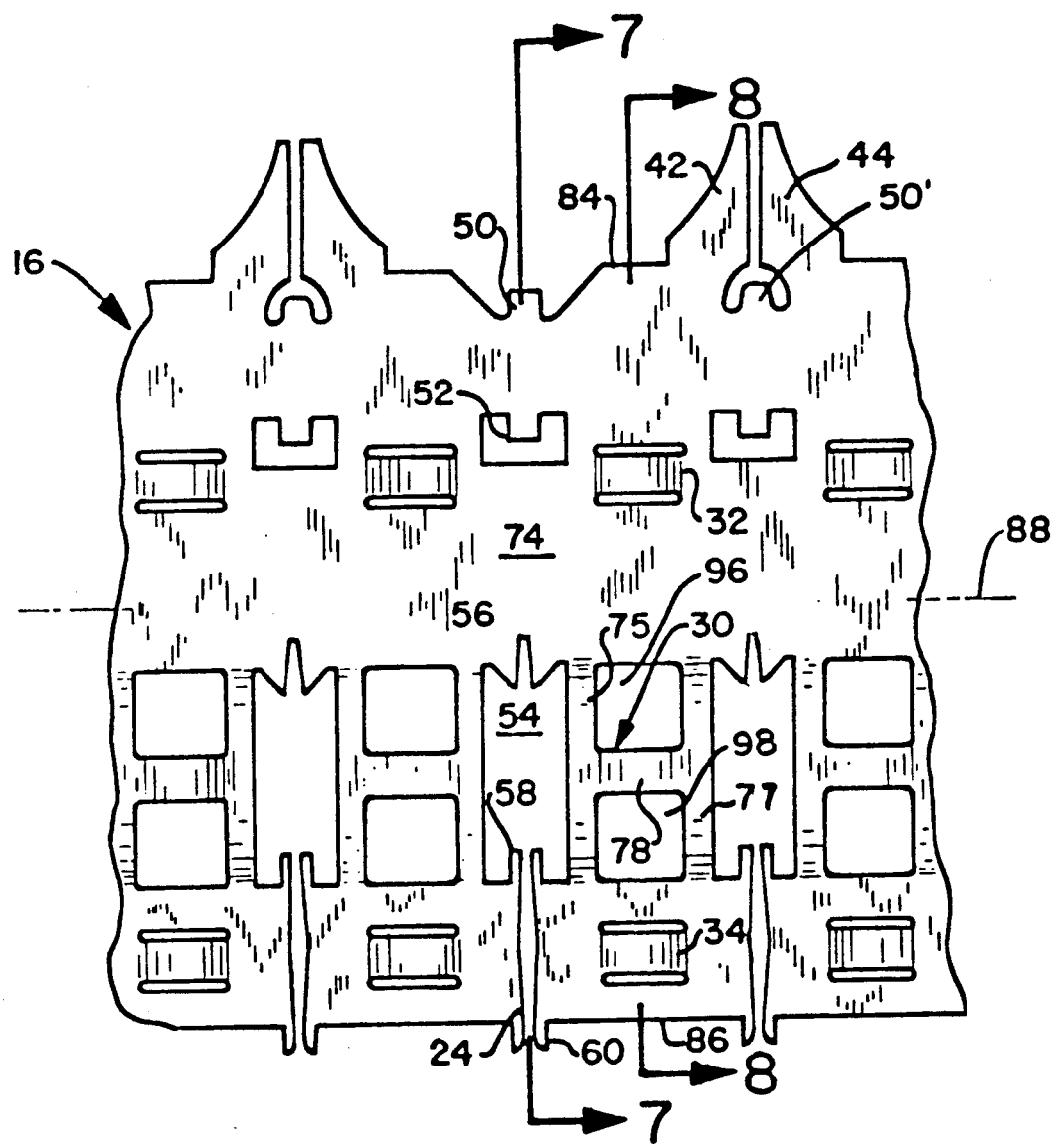
FIG. 2 is a partial elevation view of the type A grid strips oriented from left to right in FIG. 1, prior to fabrication of the grid.
Figure 3:
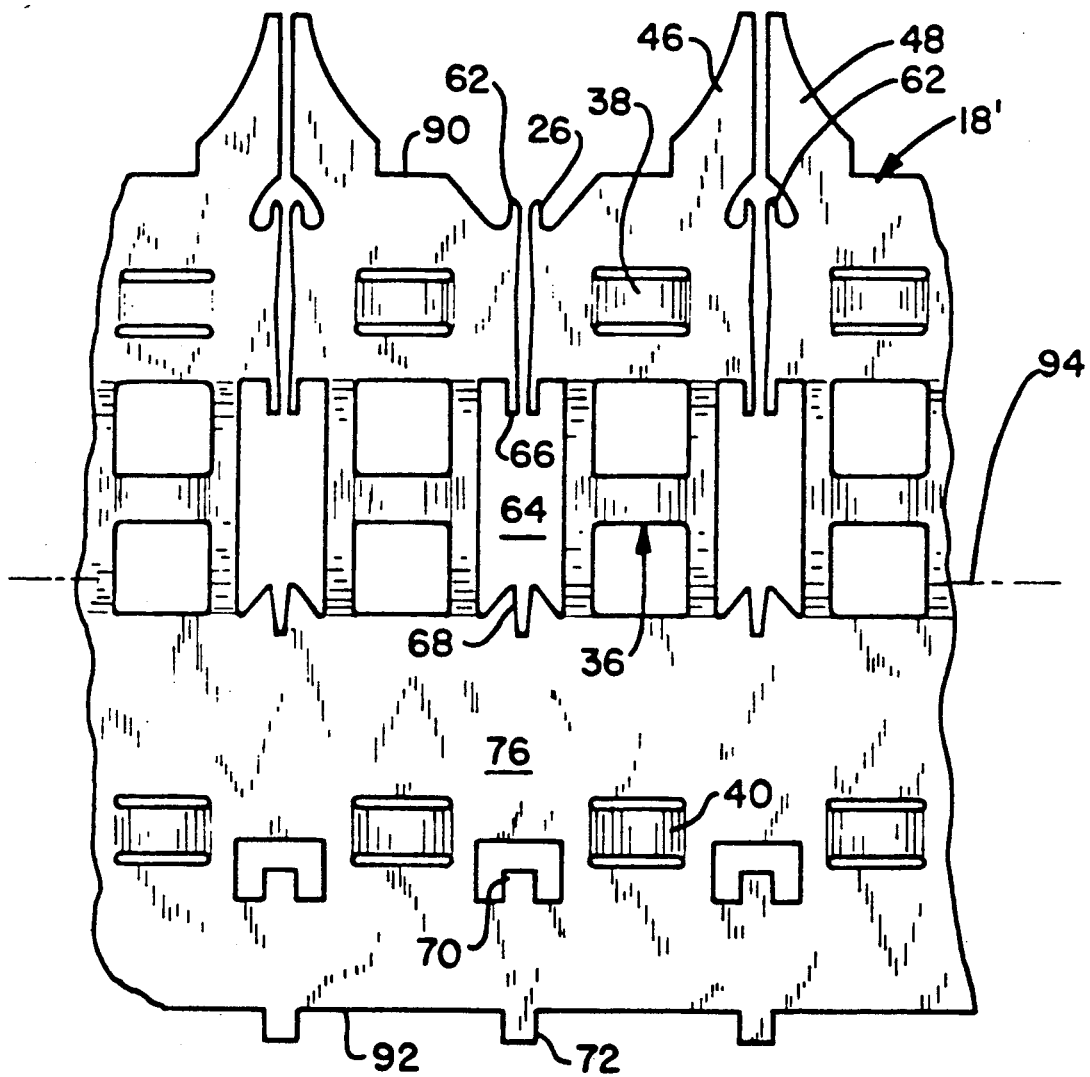
FIG. 3 is a partial elevation view of the type B grid strips oriented from top to bottom in FIG. 1, prior to fabrication of the grid.

FIGS. 2 and 3 show portions of grid strips 16 and 18, respectively, at a point in time at which the grid strips have been stamped and cut from sheets of zircaloy, and are ready for interengagement in egg crate fashion. Grid strip 16 has a plurality of vertical slots 24 which extend from the lower edge 86 of the strip toward the strip longitudinal mid-line 88, and grid strip 18 has slots 26 which extend from the upper edge 90 downwardly toward the longitudinal mid-line 94. In fabricating the grid, strip 18 would be rotated 90° into and out of the plane of the paper, whereupon grid strip 16 would be lowered thereon, such that slot 24 pass vertically through respective slots 26. This interengagement continues until all the interior strips 16,18 are interengaged, whereupon the perimeter strips 12,14 are welded to the opposed ends thereof.

Figure 4:
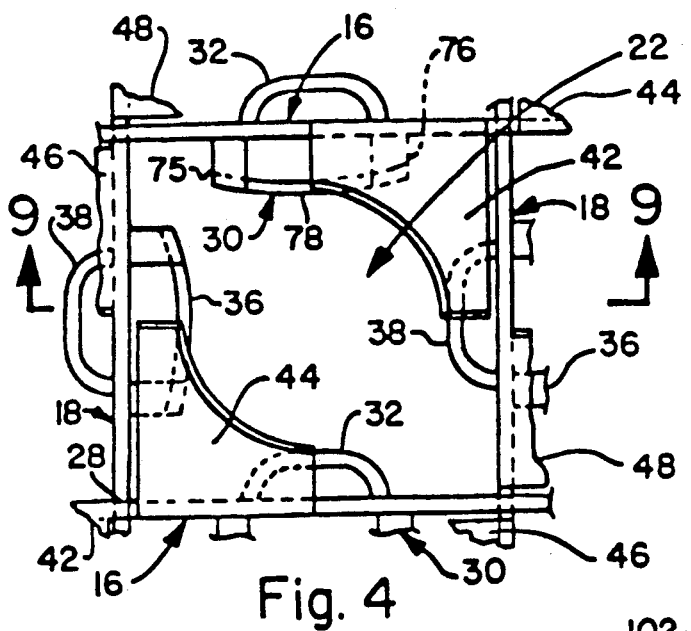
FIG. 4 is an enlarged top plan view of one of the fuel rod cells in the grid shown in FIG. 1.
Figure 5:
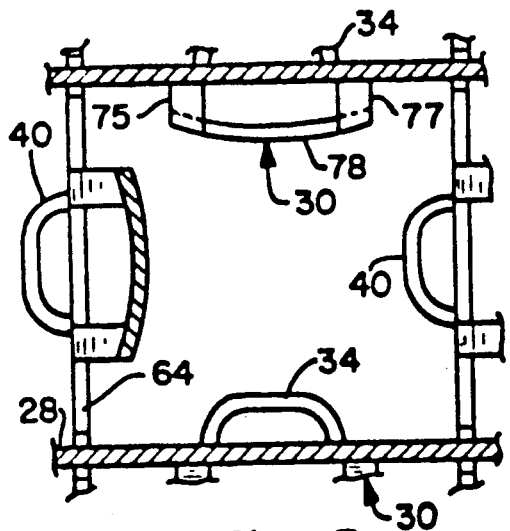
FIG. 5 is a cross-section view of the cell shown in FIG. 4, taken through the grid along line 5—5 of FIG. 9.
Figure 6:
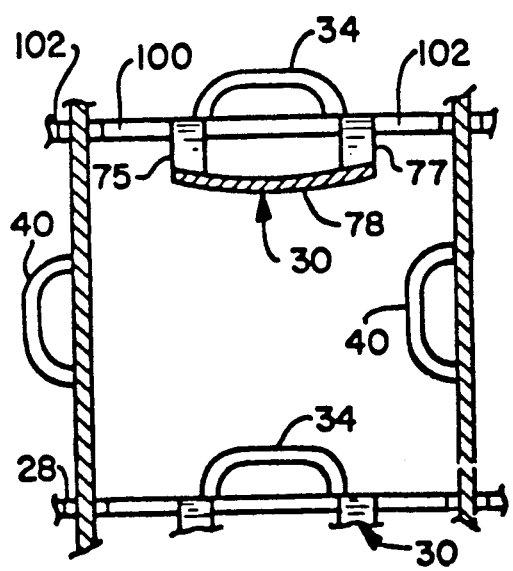
FIG. 6 is a cross-section view of the fuel cell shown in of FIG. 4, taken through the grid along line 6—6 of FIG. 9.

Referring now to FIGS. 2, 3 and 4, the overlapped, congruent slots 24,26 define a corner 28 of cell 22. The cell 22 has two walls defined by type A grid strips 16 and two walls defined by type B grid strips 18. The fuel rod support structure is carried by the cell walls. On grid strips 16 shown in FIG. 2, spring member 30 projects upwardly from the plane of the drawing, whereas integrally formed upper and lower arches 32,34 project away from the viewer. The spring member 30 and arch 34 are both below the mid-line 88 of strip 16. On strip 18, spring member 36 projects upwardly from the plane of the paper, whereas upper arch 38 and lower arch 40 project away from the viewer. On strip 18, the spring 36 and upper arch 38 are both substantially above the mid-line 94 of the strip.

The strips 16,18 carry vane structure 42,44 and 46,48, respectively, which, after interengagement of the strips into egg crate fashion and welding together of the strips, are bent toward the interior of the cells for the purpose of promoting cross-flow of the coolant during reactor operation. After the strips 16,18 have been interengaged to form the egg crate and welded together and the vanes bent, the vane 42 shown in FIG. 2 is located in the upper right portion of cell 22 shown in FIG. 4. In FIG. 4, vane 44 is associated with grid strip 16 defining the opposed wall of cell 22. Vanes 46 and 48 shown in FIG. 3, appear at 46 and 48 as projecting into neighboring cells as shown in FIGS. 1 and 4.

Figure 9:
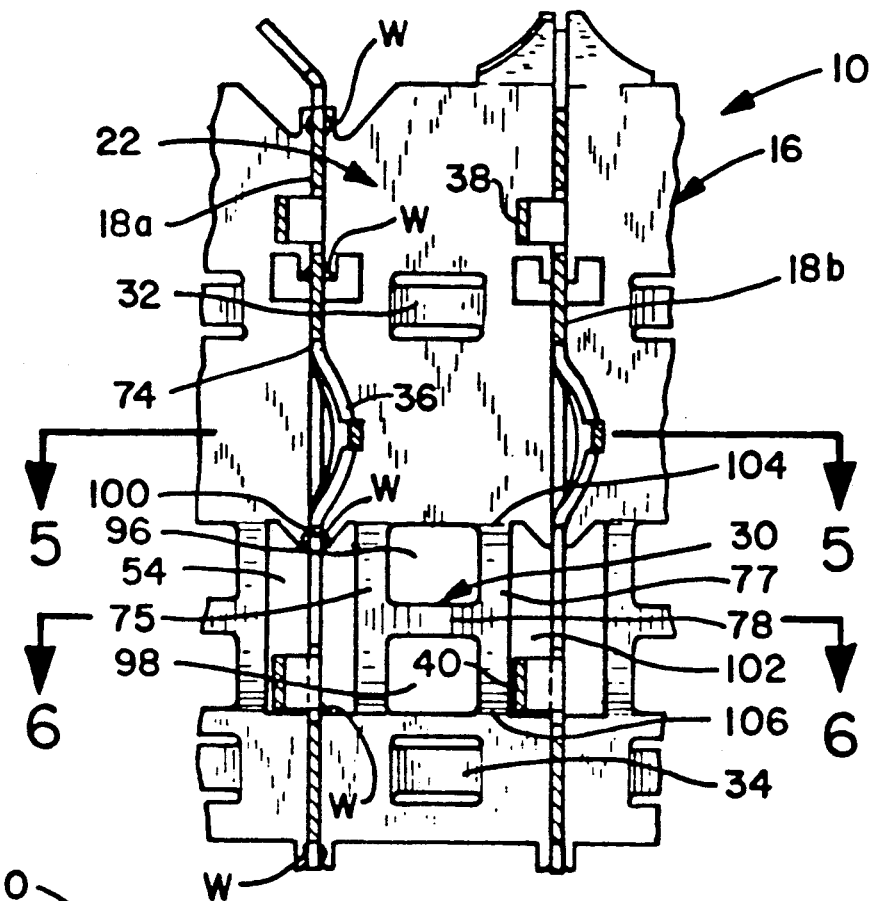
FIG. 9 is a section view in elevation of a fuel rod cell, taken along line 9—9 of FIG. 4.

The interengagement of the strips 16,18 during fabrication is initially rather loose, and requires welding to provide sufficient structural rigidity to the grid, as well as sufficient rigidity to the integral fuel rod support structure. As shown in FIGS. 2 and 9, the vertical line of intersection of grids 16 and 18 would be along the vertical portion of section line 7—7. As observed from top to bottom along this line, the strip 16 includes a weld tab 50 at or adjacent the upper edge 84, interior weld tabs 52, 56 and 58, and weld tab 60 at or adjacent the lower edge 86. Tab 50' associated with the next vertical intersection line to the right of that indicated at 7—7 in FIG. 2, is equivalent to tab 50. Likewise in FIG. 3, the intersection line passing through slot 26, has weld tab structure associated therewith in the form of tab 62 at or adjacent the upper edge 90, interior tabs 66, 68 and 70, and lower tab 72 at or adjacent the lower edge 92. Thus, the egg crate structure in accordance with the present invention, can be fabricated with two edge welds and three distinct interior welds, each of which have consumable tabs that form part of the completed weld nuggets indicated at W in FIG. 9. The slotted portions of weld tabs 56,58,60 and 62,66,68 are tapered as shown in FIGS. 2 and 3, to facilitate the formation of the weld nuggets such as shown in FIG. 9.

The weld tabs 52,70 shown in FIGS. 2 and 3, are defined by a generally C or U-shaped cutout laterally adjacent to the arches 32,40, respectively. The weld tabs 56,58 and 66,68, are provided at the upper and lower edges of cutouts 54,64, respectively. The cutouts associated with the weld tabs along the grid strip intersection lines, promote coolant mixing between adjacent cells, but have the disadvantage that the cutouts reduce the rigidity of the strips.

In accordance with the present invention, the integrally formed spring structure 30,36, is formed from cutout pairs 96,98 laterally adjacent to the respective large cutouts 54,64. In each case, all the cutout set 54,96,98 on strip grids 16 lie on the same (lower) side of the longitudinal mid-line 88 of the A-type strips. The analogous condition above the midline occurs with B-type strips 18. As a result, uninterrupted surfaces 74 on strip 16 and 76 on strip 18, are maintained near the strip mid-lines along the strip intersection line, e.g., along line 7—7 of FIG. 2.

This provides a combination of advantages not previously available in this art. In particular, the cutout 54 defines, and provides easy access to, weld tabs 56 and 58, which contribute metal toward the formation of a strong and rigid weld nuggets W such as at corner 28 as shown in FIGS. 4 and 9. The cutout 54 also promotes cross cell coolant mixing through the corners, which was not previously available in the prior art. These advantages are achieved while retaining a relatively rigid, uninterrupted surface at 74, which maintains the ability of the strips 16 to resist impact and other loads imposed on perimeter strip 12, for example, and transferred to the strips 16 through the transversely oriented strips 18. Of course, the correspondingly advantages are achieved with respect to the strips 18 shown in FIG. 3.

Figure 7:
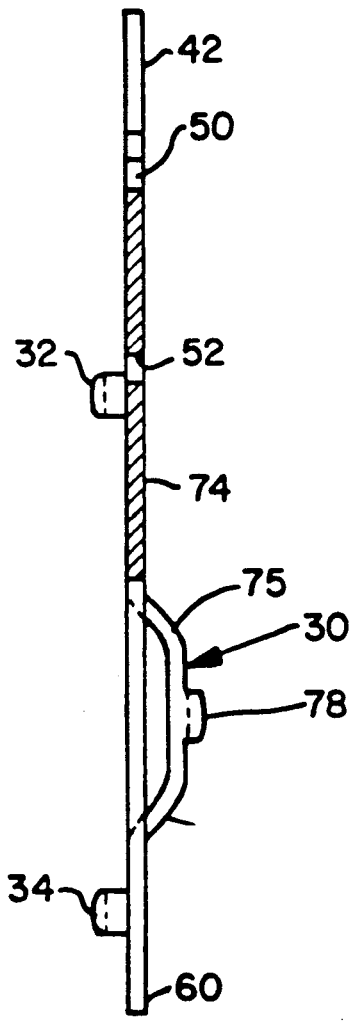
FIG. 7 is a cross-section view of the type A grid strip taken along line 7—7 of FIG. 2.
Figure 8:
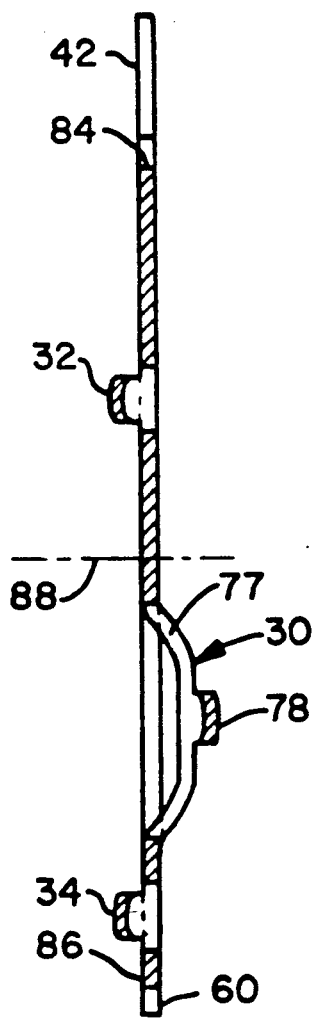
FIG. 8 is a cross-section view of a grid strip taken along line 8—8 of FIG. 2.

The fuel rod support structure in accordance with the invention will be described with reference to FIGS. 2-8. As shown in FIG. 2, the spring structure 30 on strip 16 comprises a generally H-shaped structure having laterally spaced apart, vertically oriented beams 75,77, and an integrally formed horizontally oriented spring element 78. The leaf spring element 78, unlike the conventional cantilevered spring, is integrally supported at both ends and thus does not have an unsupported edge which can interfere with the proper loading of the fuel rods into the cell. Furthermore, the arched shape of beams 75 and 77, as shown in FIGS. 7 and 8, produce a stiffer spring than conventional cantilevered springs, while retaining sufficient resiliency to permit the passage of the fuel rods into the cell during loading. The spring element 78 is preferably crowned to further facilitate such loading.

As shown particularly in FIGS. 4-9, the fuel rod support structure in accordance with the present invention, establishes two sets of spring and arch support points in each cell, each set being effective at a different elevation within cell 22. In the upper half of cell 22, spring member 36 is adapted to push the fuel rod against arches 32 and 38, whereas in the lower half of cell 22, spring member 30 pushes the fuel rod against arches 34 and 40. When all the vector forces operating on the fuel rod in the cell are summed, the fuel rod is urged from the upper left corner shown in FIG. 4, toward the lower right corner.

It should further be appreciated that on the interior strips 16 and 18, the arches 32,34 and 38,40, project from the strips, in a direction opposite to the respective spring members 30,36. In this manner, a given interior grid strip provides fuel rod support structure to every cell on both sides of the given strip.

The windows 54,64 also contribute to the unique spring structure 30,36 of the present invention. As particularly shown in FIG. 9, the spring member 30 is formed in part by the cutouts 54. In FIG. 9, opposed strips 18a,18b define two opposed walls of cell 22, and extend perpendicularly from the third wall portion defined by strip 16. As shown in the section view of FIG. 6, the joining of strips 18a,18b to strip 16 divides each window 54 into left and right portions 100,102. These portions extend vertically on either side of support beams 75,77. The upper and lower base portions 104,106 of each beam, such as 77, are integral with the surrounding strip material. The base portions of each beam 75,77, are defined in part by the upper and lower openings 96,98, as is the spring element 78.

Figure 11:
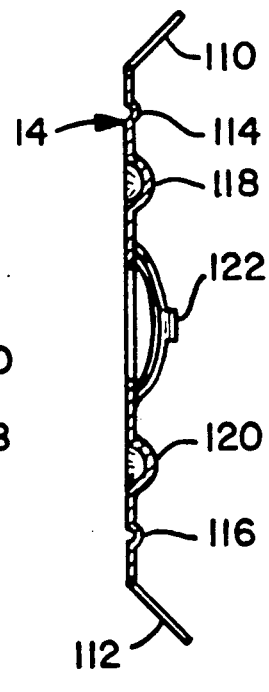
FIG. 11 is a section view of a grid perimeter strip, taken along line 11—11 of FIG. 10.
Figure 10:
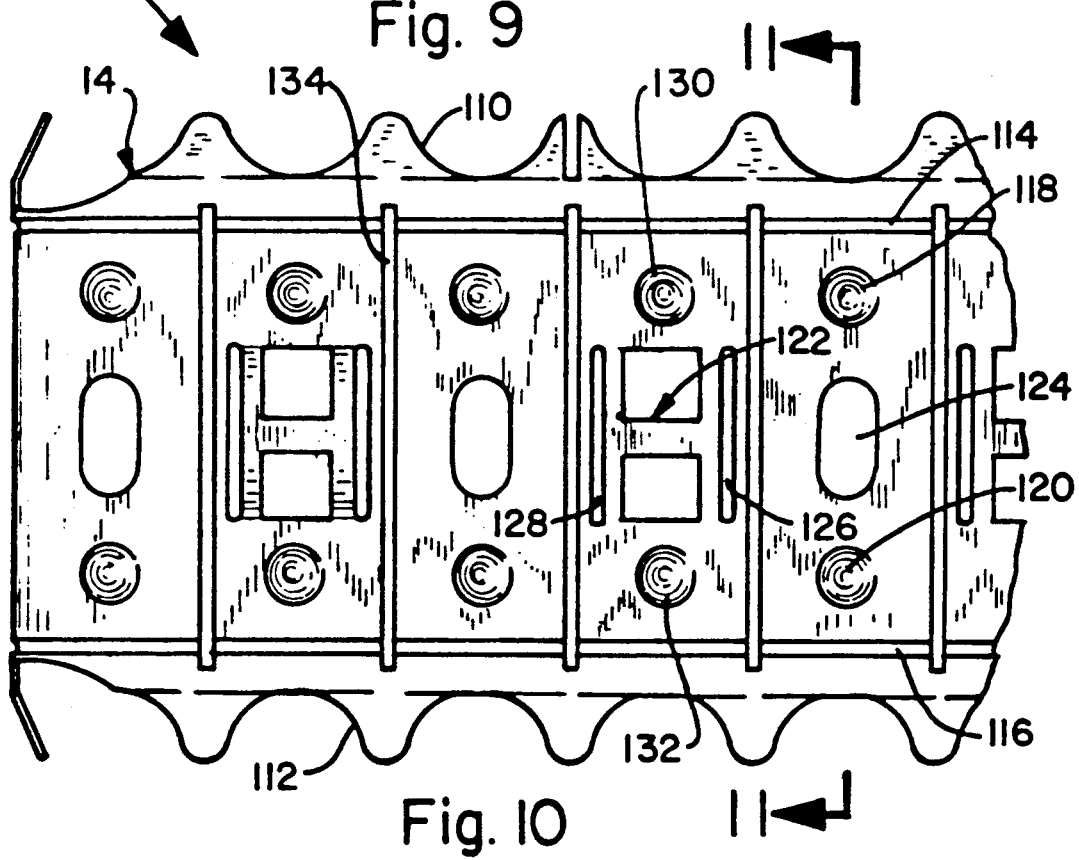
FIG. 10 is a side elevation view of the grid perimeter strip along line 10—10 of FIG. 1.

Turning now to FIGS. 1, 10, and 11, the inventive features of the perimeter strips 12,14, will be described in greater detail. Unlike the interior strips 16,18, the perimeter strips have fuel rod support structure on only the inner side thereof. The outer sides are designed so that during fuel assembly loading and reactor operation, they bear vertical sliding loads or horizontal impact loads. The internal strips 16 are welded at their ends to the opposed perimeter strips 14, as represented at 80 in FIG. 1, and the other internal grid strips 18 are welded at their ends to the inner surface of opposed grid strips 12, as indicated at 82. Each of the perimeter strips, such as 14 shown in FIG. 10, has a laterally alternating sequence of fuel support structure, one type of which consists of upper dimple 118, lower dimple 120, and central window 124, and the other type of which consists of upper dimple 130, lower dimple 132 and spring member 122. On the perimeter strips, the spring structure is substantially centrally located relative to the longitudinal mid-line. In a modified form relative to the openings 100,102 on either side of spring member 30 shown in FIG. 9, the corresponding openings 128,126 on the perimeter strip are narrower, and are not intersected or bordered by the corners of the cell. This gives greater area for welding the ends of the interior strips.

The perimeter strips preferably include upper and lower, ribs 114,116, respectively, which extend horizontally the full length of the perimeter strip, above and below the dimples 118,120, respectively, and projecting toward the grid interior. The upper and lower edges of the perimeter strip include vanes 110,112 in a conventional manner.

As is evident in a comparison of the spring members 30 shown in FIG. 9 and 122 shown in FIG. 10, the openings or cutouts in the strip material, which define the two beams and leaf spring element such as 75, 77 and 78, can take a variety of forms, and need not be limited to the two examples shown herein. The spring structure in accordance with the present invention, represents, in effect, a hybrid between the very rigid arches, such as 32,34, which have been used conventionally only as stop surfaces, rather than resilient members, and the cantilevered leaf spring of the type disclosed in U.S. Pat. No. 4,879,090. Such cantilevered springs are typically formed by first cutting out a generally C-shaped segment of material, and then bending the rectangular projection of material that remains, along a vertical bend line, such that the free end of the material projects into the fuel cell. This produces a relatively weak spring for loads transverse to the fuel rod, i.e., for preventing lateral displacement or vibration of the fuel rod within the cell.

The present invention utilizes a plurality of cutouts whereby the remaining material is deformed so as to project from the plane of the strip, but that portion of the material which contacts the fuel rod and provides the lateral spring loading at 78, is not cantilevered, but rather is in the form of a constrained beam or arch. The arch, although itself somewhat rigid, in effect "floats" on beams 75,77, which act as a somewhat resilient pedestal to provide the required resiliency to the contact portion 78. As best shown in FIGS. 7 and 8, the pedestal beams 75,77 are fixed at their upper and lower ends and are curved. The integrally formed curved beams 75,77 and associated integrally formed spring element 78 present no free edges by which the fuel rods could hang up or be scored.

Although not preferred, other embodiments of the invention could be implemented without rigidly supporting the pedestal beams 75,77 from which the spring element 78 projects against the fuel rod. The important consideration is that the spring element 78 is in the form of an arch, curved beam, or other shape that is relatively rigid but does not itself have an exposed free end, and the spring element 78 is supported by a resilient pedestal structure which could be cantilevered entirely or in part. The resilient pedestal structure is not located in the central portion of the channel through which the fuel rod passes; the only structure which is in the region which contacts the fuel rod, is the spring element 78.

It should be appreciated that the cutouts such as 54 and 66 shown in FIGS. 2 and 3 need not have the precise size and shape described herein. In general, however, the cutouts are formed so as to straddle the respective slots 24,26, with a height dimension and a width dimension at least about five times the width of the strips. In effect, the slots 24,26 are only slightly larger than the strip width, and the weld tabs 58,66 are each approximately the same thickness as the respective slots 24,26. At least one more slot thickness and preferably two or three additional slot thicknesses are provided between the tabs 58,66 and the vertical border of the cutouts 54,66. The vertical height of the cutouts 54,66 normally define the lateral boundaries of the beams 75,77, and thus the vertical height of the cutout is substantially the same as the vertical height of the spring member 30. In particular, the beams 75,77 form the legs of the "H" shape in the preferred embodiment of the spring member 30. The cutouts 96,98 vertically above and below the crosspiece 78 define the inner borders of the legs 75,77 of the H, as well as the upper and lower borders of the crosspiece 78. Preferably, the width of the windows such as 54 is the same as the width of the interior windows, 96,98, i.e., the width of crosspiece 78.

As used herein, the term "beam" includes a simple beam, which is a bar resting on supports near its ends, and cantilevered beams, which project out beyond a support. In the present context, a constrained beam means those beams held or "built in" at one or both ends, whether or not such holding allows free horizontal motion. The bar constituting a beam can have any shape in cross-section. The term "curved beam" should be understood in the conventional sense wherein the radius of curvature of the beam is large (typically at least 8 to 10 times) compared to the dimensions of its cross-section, and further includes curvature such as shown in beams 75,77 in FIGS. 7 and 8, which do not have a smooth radius of curvature throughout their length.

I claim:

1. A grid strip for a nuclear fuel assembly, comprising:
    a substantially flat body, upper and lower edges on the body defining the strip vertical height, and opposed side edges on the body defining the length of the strip;
    fuel rod support structure projecting transversely from the body, said fuel rod support structure having a plurality of spring members spaced apart in the longitudinal direction along the body, each spring member having a pedestal portion integrally and resiliently supported by the body and a contact portion integrally formed on and projecting from the pedestal portion, the pedestal portion being defined by two vertical legs and the contact portion being defined by a cross piece between the vertical legs, the legs and cross piece being formed by four cutouts in the body, two of said cutouts being laterally spaced apart so as to define the outer lateral boundaries of the legs of the spring member, and the other two cutouts being spaced vertically apart between the lateral cutouts, for defining the inner borders of the legs and the borders of said cross piece;
    a vertical slot extending from one of the upper and lower edges of the body to each of the lateral cutouts, each slot defining an intersection line for receiving another grid strip transversely to the body; and
    five weld tabs vertically aligned with each of said vertical slots, for providing material to contribute to a respective five weld nuggets when each of said other grid strips is welded to said body, two of said weld tabs being located at the upper and lower edges of the body, respectively, another two being located at said lateral cutouts, and the fifth being formed as a tab cutout in the body, between said lateral cutout and the other of said upper and lower edge, opposite the slot.

2. The grid strip of claim 1, wherein the contact portion is in the form of a horizontally oriented beam integrally constrained at both ends to the pedestal portion.

3. The grid strip of claim 2, wherein the horizontally oriented beam of the contact portion, is a curved beam.

4. A nuclear fuel assembly grid of the type having four perimeter strips defining a substantially square grid envelope and a plurality of zircaloy interior strips of substantially the same thickness, each having opposed ends connected to respective opposed perimeter strips and having upper and lower longitudinal edges which are slotted and orthogonally interengaged to define a plurality of fuel support cells within the envelope, each cell having four walls including support means in the form of spring members and stop members integrally formed thereon for receiving and resiliently retaining a fuel rod, wherein the improvement comprises:
    said interior strips being of two complementary kinds, the first (A) having each slot extending from the lower edge to approximately the strip longitudinal center line, and the second (B) having each slot extending from the upper edge to approximately the strip longitudinal center line, so that the A strips are orthogonally engaged with the B strips by the congruent overlapping of the respective slots along respective lines of intersection, whereby each cell has two walls defined by A strips and two walls defined by B strips;
    each wall defined by an A strip having integrally formed stop members above and below the strip mid-line and a spring member integrally formed substantially below the strip midline;
    each wall defined by a B strip having integrally formed stop members above and below the strip mid-line and a spring member integrally formed substantially above the strip midline;
    wherein each cell includes,
        a first wall defined by a first A strip in which the spring member projects into said cell and the stop members project into a neighboring cell,
        a second wall defined by a B strip in which the spring member projects into said cell and the stop members project into a neighboring cell,
        a third wall defined by a second A strip in which the spring member projects into a neighboring cell and the stop members project into said cell, and
        a fourth wall defined by a second B strip in which the spring member projects into a neighboring cell and the stop members project into said cell; and
    wherein each spring member has a pedestal portion formed by two parallel, vertical leg beams integrally constrained at both ends and a horizontal cross piece for contacting the fuel rod and formed as an integral beam projecting from the legs, thereby forming an "H" shaped spring member integral with and projecting from the strip, each said spring member being defined by four rectangular cutouts in the strip, wherein a first two cutouts are laterally spaced apart so as to define the outer lateral boundaries of the legs of the H, and a second two cutouts are spaced vertically apart between the first cutouts, for defining the inner borders of the legs and the borders of said cross piece, the height of each first cutout being substantially equal to the height of the leg portions of the spring members and the width of each first cutout being substantially equal to the horizontal length of the cross piece spanning the leg portions.

5. The fuel assembly grid of claim 4 wherein each first cutout includes two vertically aligned tabs which partially define portions of the slots prior to interengagement of the strips, each of said tabs forming a weld nugget with an interengaged strip in the fabricated grid.

6. The fuel assembly grid of claim 4, wherein each line of intersection passes through one of said first cutouts and five weld nuggets and vertically spaced apart along each line of intersection, two of said weld tabs being located at the upper and lower edges of the strip, respectively, another two of said weld tabs being located at said first cutout, and a fifth weld tab being formed as a tab cutout between the first cutout and the edge of the strip that is opposite the edge in which said slot is formed.

7. The fuel assembly of claim 5, wherein the slot portions defined by said tabs are tapered so as to closely fit the interengaged strip before the weld nugget is formed.

8. A grid strip for a nuclear fuel assembly, comprising:
   a substantially flat body, upper and lower edges on the body defining the strip vertical height, and opposed side edges on the body defining the length of the strip;
   fuel rod support structure including a plurality of spring members spaced apart in the longitudinal direction along the body and projecting integrally therefrom, each spring member having a pedestal portion formed by two parallel, vertical leg beams integrally constrained at both ends by the body and a horizontal contact portion formed as an integral horizontal beam spanning and projecting from the legs, thereby forming an "H" shaped spring member integral with and projecting from the body;
   each said spring member being defined by four substantially rectangular cutouts in the body, wherein a first two cutouts are laterally spaced apart so as to define the outer lateral boundaries of the legs of the H, and a second two cutouts are spaced vertically apart between the first cutouts, for defining the inner borders of the legs and the borders of said cross piece;
   a vertical slot extending from one of the upper and lower edges of the body, to each of the first cutouts, said slot defining an intersection line for receiving another grid strip transversely to the body; and
   five weld tabs vertically aligned with each of said vertical slots, for providing material to contribute to a respective five weld nuggets when each of said other grid strips is welded to said body, two of said weld tabs being located at the upper and lower edge of the body, respectively, another two being located at each of said first cutout, and the fifth being formed as a tab cutout in the body, between a first cutout and the other of said upper and lower edge, opposite the slot.

9. The grid strip of claim 8, wherein the parallel beams of the pedestal portion, are curved beams.

10. The grid strip of claim 8, wherein the horizontally oriented beam of the contact portion, is a curved beam.

11. The grid strip of claim 8, including a pair of rigid stop members in vertical alignment with the spring member and integrally projecting from the body in a direction opposite to the projection of the spring member, one of said stop members being located above and the other below the spring member.

12. The grid strip of claim 8, wherein the pedestal portion and contact portion are formed by curved beams.

* * * * *